(12) United States Patent
Thotton Veettil

(10) Patent No.: US 12,108,361 B2
(45) Date of Patent: Oct. 1, 2024

(54) METHODS AND SYSTEMS FOR RADIO FREQUENCY SIGNATURE GENERATION AND POSITION ESTIMATION

(71) Applicant: Charter Communications Operating, LLC, St. Louis, MO (US)

(72) Inventor: Vinayak Kumar Thotton Veettil, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 333 days.

(21) Appl. No.: 17/679,466

(22) Filed: Feb. 24, 2022

(65) Prior Publication Data

US 2023/0269693 A1 Aug. 24, 2023

(51) Int. Cl.
*H04W 64/00* (2009.01)

(52) U.S. Cl.
CPC .................. *H04W 64/00* (2013.01)

(58) Field of Classification Search
CPC ......... H04W 64/00; H04W 4/30; H04W 4/80; H04W 4/70; H04W 4/029; H04W 4/023; H04W 4/38; H04W 4/33; H04L 67/303
See application file for complete search history.

(56) References Cited

U.S. PATENT DOCUMENTS

| | | | |
|---|---|---|---|
| 9,237,543 B2 | 1/2016 | Karr et al. | |
| 2015/0341894 A1* | 11/2015 | Rowitch | H04W 64/003 455/456.1 |
| 2016/0309294 A1* | 10/2016 | Li | H04L 43/0864 |
| 2017/0201976 A1* | 7/2017 | Yue | H04B 7/0617 |
| 2018/0184265 A1* | 6/2018 | Wan | H04L 67/303 |
| 2019/0033423 A1 | 1/2019 | Moshfeghi | |
| 2019/0215796 A1* | 7/2019 | Poosamani | H04W 64/003 |
| 2022/0264514 A1* | 8/2022 | Butt | G01S 5/0244 |

OTHER PUBLICATIONS

Meyer, Franz J., Jeremy B. Nicoll, and Anthony P. Doulgeris. "Correction and characterization of radio frequency interference signatures in L-band synthetic aperture radar data." IEEE Transactions on Geoscience and Remote Sensing 51.10 (2013): 4961-4972. (Year: 2013).*

Chatterjee, Baibhab, et al. "RF-PUF: Enhancing IoT security through authentication of wireless nodes using in-situ machine learning." IEEE internet of things journal 6.1 (2018): 388-398. (Year: 2018).*

* cited by examiner

*Primary Examiner* — Sharad Rampuria
(74) *Attorney, Agent, or Firm* — Young Basile Hanlon & MacFarlane, P.C.

(57) ABSTRACT

Described is a method and system for radio frequency (RF) signature generation and position estimation using the RD signature. A method includes receiving, by a server, a RF signature associated with a user device present in a connected environment, updating, by the server, stored RF signatures based on RF signatures received from the user device, monitoring stations, and active radio emitting devices in the connected environment when a defined threshold for one or more stored RF signatures is exceeded, where each stored RF signature corresponds to a subdivision in the connected environment, and estimating, by the server, a location of the user device in the connected environment by comparing the RF signature of the user device with the stored RF signatures or updated stored RF signatures.

18 Claims, 12 Drawing Sheets

METHODS AND SYSTEMS FOR RADIO FREQUENCY SIGNATURE GENERATION AND POSITION ESTIMATION

TECHNICAL FIELD

This disclosure relates to position or location estimation. More specifically, using radio frequency (RF) fingerprints or signatures for position estimation.

BACKGROUND

Cellular networks provide cellular service to users using radio coverage cells or geographical areas, where each radio coverage cell is associated with a base station, cell tower, or cell site. Macrocells provide the largest radio coverage cells as the associated base stations have power outputs on the order of tens of watts. Small cells are low-power, short range systems which cover or provide smaller geographical areas in contrast to macrocells. Small cells may be deployed in indoor environments such as buildings, stores, airports, and hospitals, and small outdoor spaces such as arenas, parks, and the like. Small cells can refer to small cells, femtocells, picocells, and microcells, for example. Small cells are used in conjunction with macrocells.

Position or location determination or estimation of a user device in the cellular network can be done using signal strength and trilateration techniques and time of arrival and triangulation techniques, for example. However, macrocells employing these techniques may not provide sufficient resolution and/or have latency issues.

SUMMARY

Disclosed herein are methods and systems which use radio frequency (RF) fingerprints or signatures for position estimation.

In some implementations, a method includes receiving, by a server, a RF signature associated with a user device present in a connected environment, updating, by the server, stored RF signatures based on RF signatures received from the user device, monitoring stations, and active radio emitting devices in the connected environment when a defined threshold for one or more stored RF signatures is exceeded, where each stored RF signature corresponds to a subdivision in the connected environment, and estimating, by the server, a location of the user device in the connected environment by comparing the RF signature of the user device with the stored RF signatures or updated stored RF signatures.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
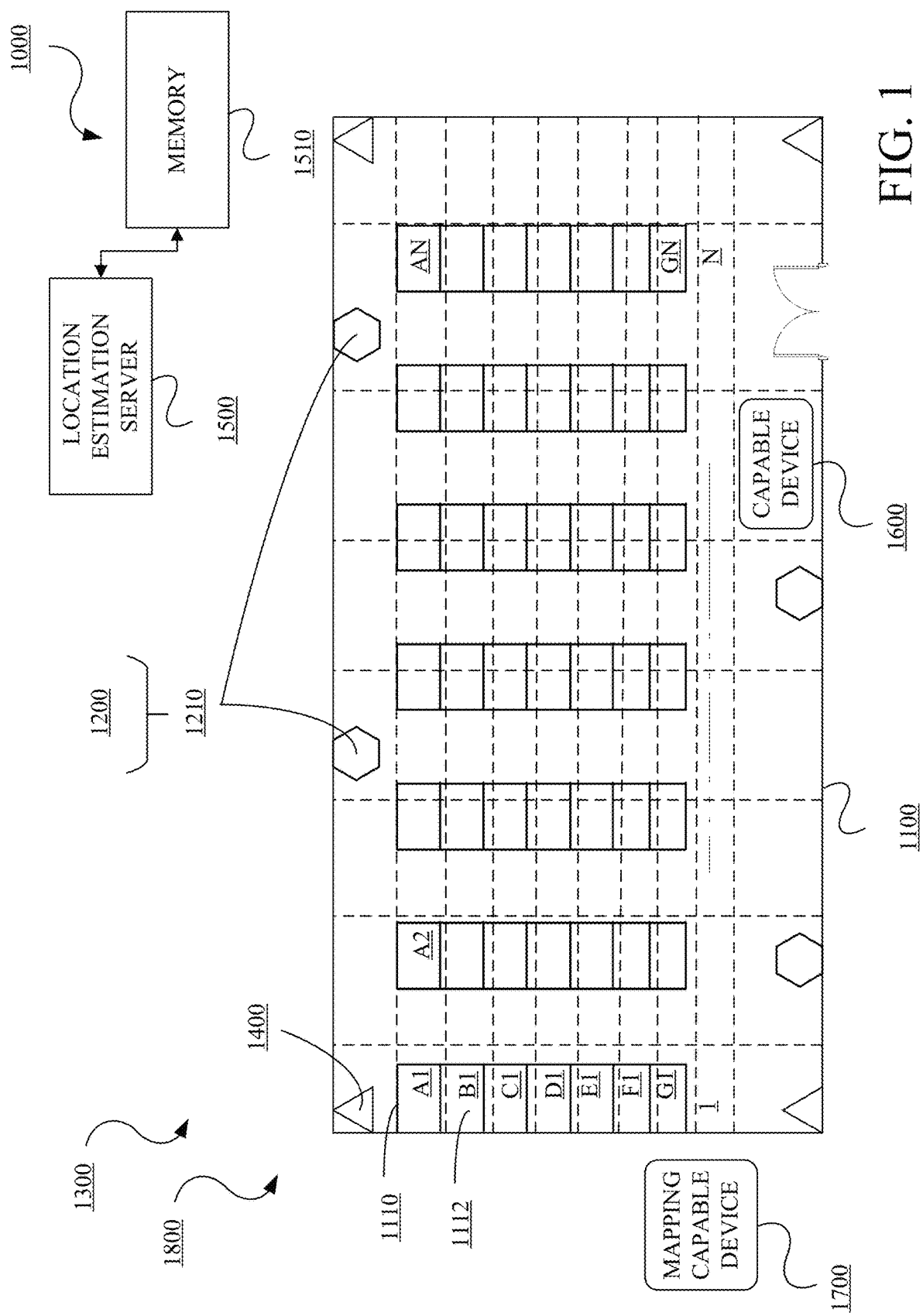
FIG. 1 is a diagram of an example an architecture for estimating device location based on RF fingerprints in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Disclosed herein are methods and systems for estimating a position of a device in a connected environment using radio frequency (RF) fingerprints or signatures. An environment, such as a building, an arena, or an ad hoc configuration, can be provided or enabled with wireless coverage using for example, a small cell system or other active or transmitting radio elements (collectively referred to herein as "active radio elements") (referred to herein as a "connected environment"). The connected environment can be divided into subdivisions. In implementations, the subdivisions may or may not be equally spaced and/or may or may not be uniformly distributed. One or more of the subdivisions can contain an active radio element. Each active radio element can have an interference degree associated with it, where the interference degree indicates the level of RF interference with respect to other subdivisions.

During a training phase, a RF fingerprint can be determined and stored for each subdivision in the connected environment. For example, each of the subdivisions in the connected environment may have an initial or baseline RF signature. The initial or baseline RF signature is determined by a device capable of measuring radio signal strengths and signal quality at one or more of the subdivisions and determining a RF signature from the measured radio signal strengths and signal quality for that subdivision (referred to herein as a "capable device") ("training capable device"). The training capable device can report the RF signature, the radio signal strengths and signal quality, and device information to a server, which stores each of the RF signatures. The stored RF signatures can be updated as needed.

The server can estimate the position of a user capable device using the stored RF signatures, where the user capable device is a capable device requiring an estimation of its position with respect to a connected environment. The user capable device determines its RF signature and reports the RF signature along with the measured radio signal strengths and signal quality, and device information to the server. For example, the device information can include standard baseline signal reporting to define the user capable device's transmitter, receiver, or transceiver qualities or characteristics. The server can then normalize the radio signal strengths and signal quality based on the device information. For example, the server can adjust the radio signal strengths and signal quality based on the user capable device specific loses or gains as identified in the device information. The server adjusts the user capable device determined RF signature using the normalized radio signal strengths and signal quality values. The server estimates the location of the user capable device in the connected environment by comparing the adjusted RF signature with the stored RF signatures. The positioning accuracy may depend on the subdivision granularity of the environment and/or the permissible computational complexity involved in tracking and keeping up-to-date the RF signatures for the RF environment.

In implementations, the RF fingerprints stored for the trained connected environment can be updated and maintained based on RF changes in the trained connected environment due to device density, changes in wireless coverage system changes, changes in environment, loading conditions, traffic conditions, changes in active radio elements, and other RF impacting conditions. That is, the server, for example, can continually adjust and maintain current and accurate RF fingerprints throughout all the subdivisions. The server can calculate and maintain the RF fingerprints across all subdivisions at substantially the same time as a complete unit. If any subdivision in the trained connected environment has a RF fingerprint modified, these changes may be propagated across the entire trained connected environment depending on the nature of the change, type of update mechanism, and degree of interference as between neighboring subdivisions. The types of update mechanisms can include localized, blanket, and universal update mechanisms. The localized update mechanism addresses changes that affect neighboring subdivisions as indicated by an assigned interference degree. The blanket update mechanism addresses factors that are affecting the whole space (e.g., the connected environment) and hence changing the RF signatures across all the subdivisions. However, these blanket changes also receive a feedback from the changes occurring in the subdivisions and hence are not a completely isolated factor. The universal update mechanism addresses factors that are affecting the whole space and hence changing the RF signatures across all the subdivisions. However, these are completely isolated from the changes occurring in the subdivisions and hence they are not receiving any feedback from the state of the RF in the subdivisions.

FIG. 1 is a diagram of an example an architecture 1000 for estimating device location based on RF fingerprints in accordance with embodiments of this disclosure. The architecture 1000 can include an environment or premise such as a store 1100, for example. The store 1100 can have, include, or be provided with wireless or RF coverage via wireless networks such as cellular networks, WiFi networks, and the like (i.e., a connected store 1100). For example, the store 1100 can have, include, or be provided with RF coverage provided via a small cell network 1200, which can include base stations 1210. The type of wireless network and number of base stations is illustrative and the architecture 1000 and/or store 1100 may include different wireless networks with an appropriate number of base stations to provide the wireless coverage. The architecture 1000 can include a RF signature or fingerprint location estimation system 1300 which can include monitoring stations 1400, a location estimation server 1500, and a memory 1510. A user capable device 1600 can be in communication with one or more of the base stations 1210 and the server 1500. The communications between the user capable device 1600 and the one or more of the base stations 1210 and the server 1500 can include wired communications, wireless communications, or a combination thereof. In implementations, a mapping capable device 1700 can be in communication with one or more of the base stations 1210 and the server 1500. The architecture 1000 can include active radio units 1800 including, but not limited to, base stations 1210, the monitoring stations 1400, the user capable device 1600, the mapping capable device 1700, RF identification (RF) active transponders, other RF radiating devices or elements, and combinations thereof.

The store or connected store 1100 and the small cell network 1200 is an illustrative use case of implementing the method for estimating device location based on RF fingerprints. In some implementations, an ad hoc connected environment can be established by deploying active radio units in an environment. For example, the active radio units may be used as a self-configurable and self-organizing wireless network.

In some implementations, the appropriate components of the architecture 1000 may execute the techniques described in FIGS. 6-12. The architecture 1000 is illustrative and may include additional, fewer, or different devices, entities and the like which may be similarly or differently architected without departing from the scope of the specification and claims herein. Moreover, the illustrated devices may perform other functions without departing from the scope of the specification and claims herein.

A volume representative of the store or connected store 1100, for example, can be divided up into sub-volumes or subdivisions. The subdivision resolution is dependent on the wireless infrastructure, nature of the environment, and computational infrastructure. In the instant example, the store or connected store 1100 can include, for example, one or more aisles 1 . . . N 1110. Each aisle 1 . . . N 1110 can have, for example, shelfs A-G. Each shelf A-G can have multiple slots. The subdivisions could represent each of the slots, each shelf A-G, or an aisle. Each of the subdivisions may not be equally spaced or sized. That is, certain subdivisions may be bigger than others. For example, a multi-resolution division can be used. In an example, RFIDs can be positioned on each aisle 1 . . . N 1110, on each shelf A-G, on each slot of each shelf A-G, or combinations thereof depending on resolution.

Each of the subdivisions is associated with an interference degree. The interference degree indicates the degree of interference between the subdivision and the other subdivisions. For example, an interference degree of 0 for a subdivision indicates no association with other subdivisions, an interference degree of 1 for a subdivision indicates an association with immediate neighbor subdivisions, and an interference degree of 2 for a subdivision indicates an association with immediate neighbor subdivision and an association with the immediate neighbor's immediate neighbor subdivision, and so on. This is further illustrated with respect to FIG. 2. The interference degree for the subdivisions is determined during a training phase of the connected environment and updated as necessary during the operational phase as described herein.

Figure 2:
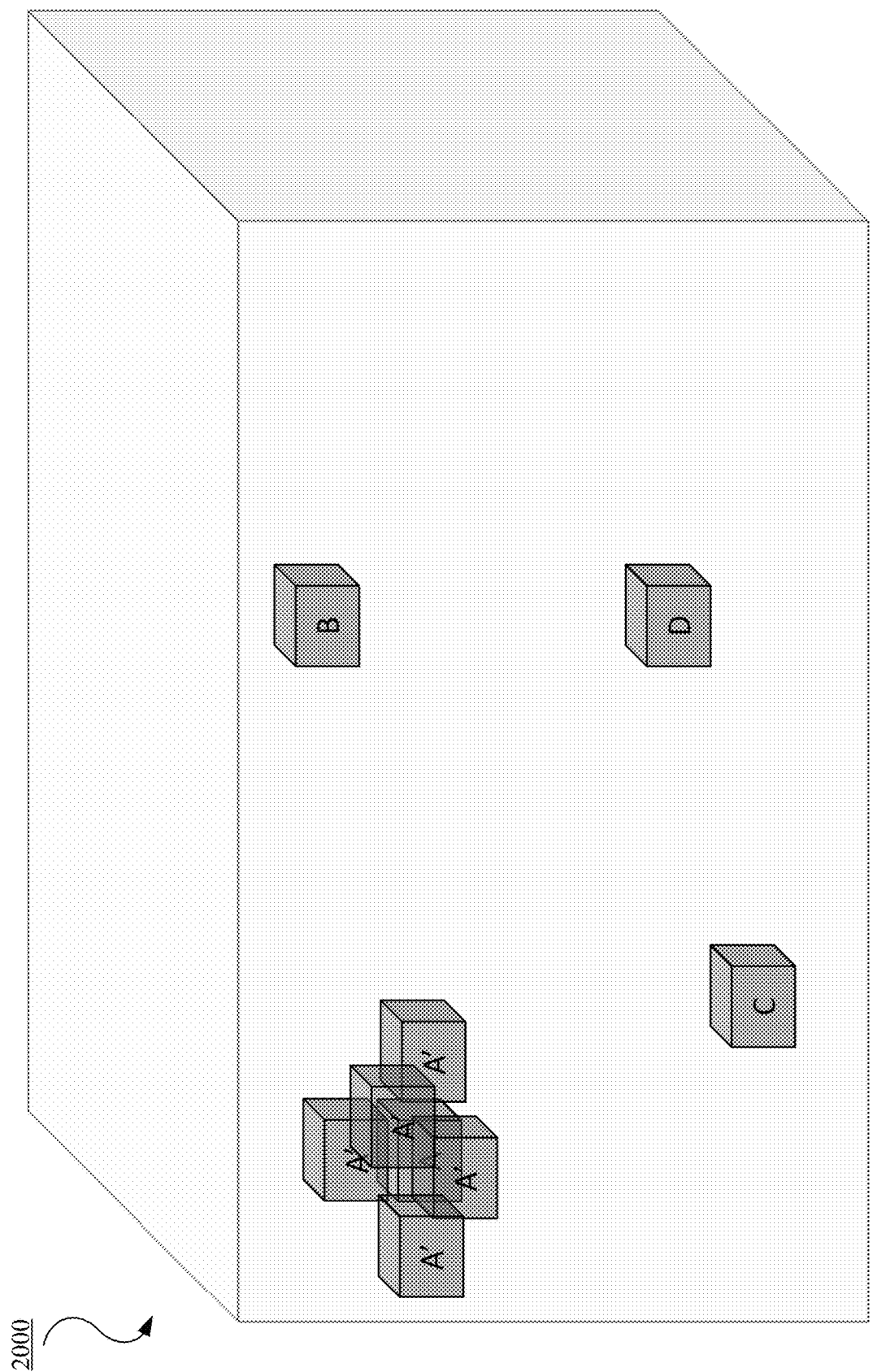
FIG. 2 is a block diagram of an example space in accordance with embodiments of this disclosure.

FIG. 2 is a block diagram of an example space 2000 in accordance with embodiments of this disclosure. The space 2000 can be subdivided into subdivisions A, B, C, D, and so on. The subdivisions are not equally sized or spaced. As noted, each subdivision has an interference degree. The interference degree indicates the local interference influence of a point such as a subdivision. If there is a change in the RF signal strength or signal quality at any point then it will affect in varying levels all the points within its local interference unit. The local interference unit is defined by or based on the degree of interference of each point. Points beyond the local interference units are assumed to be unaffected by the changes in RF signal strength and quality detected at a certain point in space. The amount of change observed at various points within the local interference unit will be as per a given interference factor that is associated with each of the points within the local interference unit for the specific point where the interference is originating from. If the interference at any of the points within the local interference unit exceeds a defined or configurable threshold, these specific points will be considered the new points of origins and will propagate the changes within their specific local interference units and so on across the whole space. If the interference degree of a point is 0 then it is not associated with any other neighboring points. Each point in space will be associated with its immediate neighboring points if the interference degree is 1. Each of these points in space will be associated with its immediate neighboring points and the immediate neighbors of those points if its interference degree is 2 and so on.

Referring back to FIG. 1, the small cell network 1200 can be a wireless network which is implemented with low-powered cellular radio access nodes, such as the base stations 1210, that operate in licensed and unlicensed spectrum that have a range of 10 meters to a few kilometers. In this instance, the small cell network 1200 can refer to femtocells, picocells, and microcells. These type of wireless networks can be used to provide in-building and outdoor wireless service. They are used extend service coverage into areas or premises where macro-cellular is deficient. The small cell network 1200 can be operated and/or provisioned for operation with a mobile service operator (MSO), mobile virtual network operator (MVNO), or service provider.

The base stations 1210 may be a base station, an access point, an access node or like device which enables radio communications access between, for example, the capable device 1600 and the Internet to services, application based services, and other devices, for example. The base stations 1210 can be operated and/or provisioned for operation with a MSO, MVNO, or service provider.

The monitoring stations 1400 of the RF fingerprint location estimation system 1300 continually scan for and report RF changes and changes in any factors that may affect the RF signatures of each subdivisions and the interference degree for a subdivision. These changes as and when they occur are reported back to the location estimation server 1500 which will then execute the methods described herein to update the RF signatures and/or interference degree for the appropriate subdivisions or points in the volume representative of the premise or environment. In these instances, the information results in changes in the RF signatures beyond a defined threshold, over a defined period of time, or combinations thereof. The number and placement of the monitoring stations is variable. For example, it can depend on resolution. The monitoring stations may be mobile devices that are moved through the trained connected environment in a defined manner to obtain and provide updated information including updated RF signatures.

The location estimation server 1500 can estimate the position of the user capable device 1600 using the stored RF signatures. The location estimation server 1500 can store RF signatures for the connected environment in the memory 1510 once a training phase is completed based on the RF signatures not changing or having changes within a defined threshold. The stored RF signatures can be updated based on information from the monitoring stations 1400 and/or the user capable device 1600.

The user capable device 1600 can be, but is not limited to, Internet of Thing (IoT) devices, sensors, end user devices, cellular telephones, Internet Protocol (IP) devices, mobile computers, laptops, handheld computers, personal media devices, smartphones, notebooks, notepads, and the like and can be provisioned for operation with a MSO, MVNO, or other like service provider.

The mapping capable device 1700 can be, but is not limited to, Internet of Thing (IoT) devices, sensors, end user devices, cellular telephones, Internet Protocol (IP) devices, mobile computers, laptops, handheld computers, personal media devices, smartphones, notebooks, notepads, and the like and can be provisioned for operation with a MSO, MVNO, or other like service provider.

Figure 3:
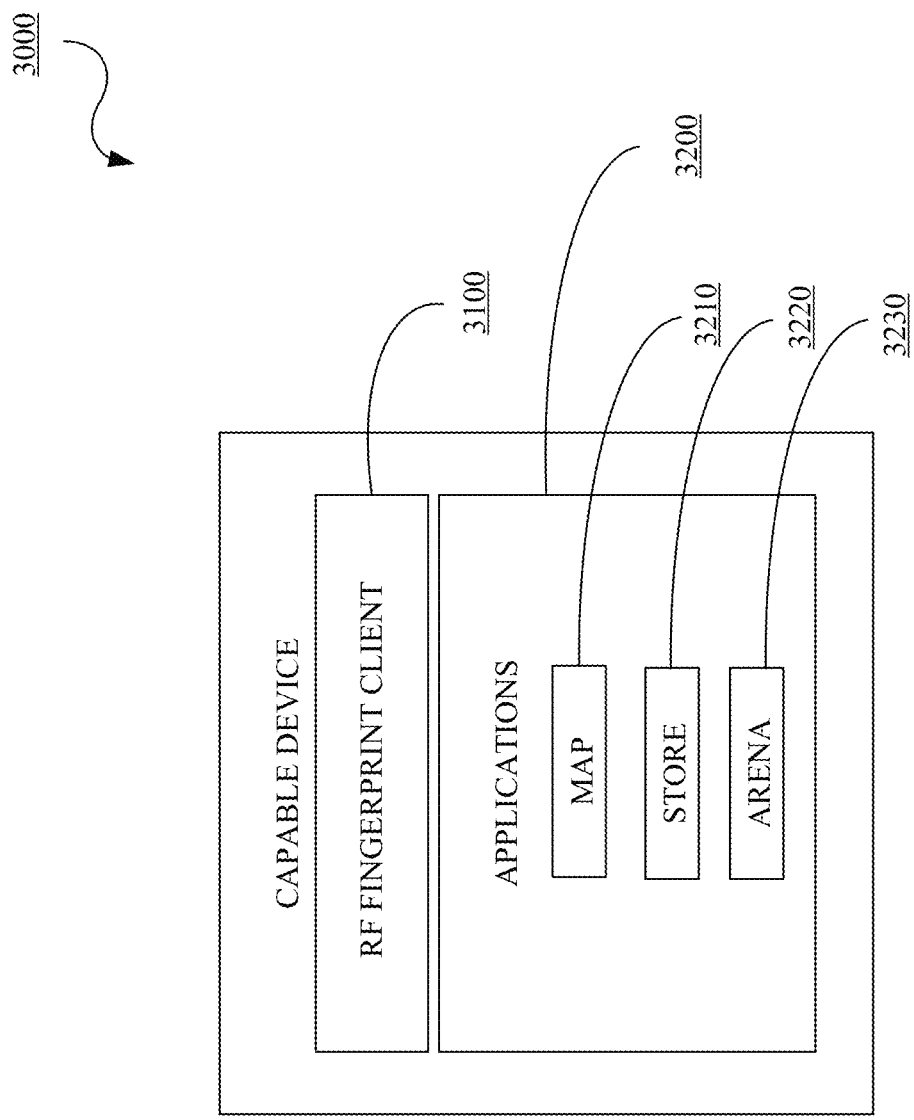
FIG. 3 is a block diagram of an example of a capable device in accordance with embodiments of this disclosure.

The user capable device 1600 and/or the mapping capable device 1700 can be a capable device 3000 as shown in FIG. 3. The capable device 3000 can include a RF signature client 3100 in communications with the location estimation server 1500 and applications such as, but not limited to, a map application 3210, a store application 3220, an arena application 3230 and the like. Each of the map application 3210, the store application 3220, and the arena application 3230 can use the RF client 3100 to provide location estimation services and guidance with respect to their respective environments.

Figure 4:
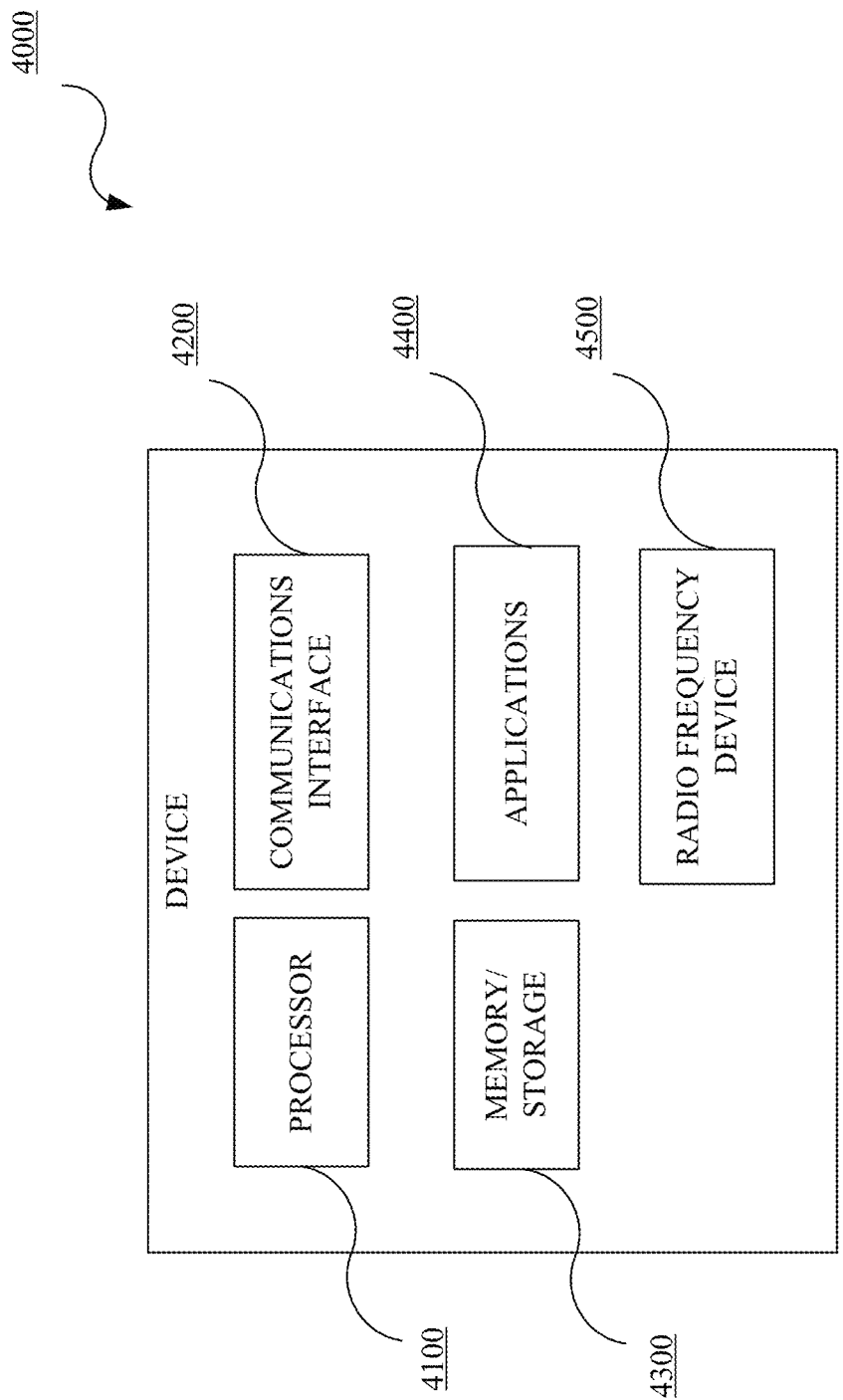
FIG. 4 is a block diagram of an example of a device in accordance with embodiments of this disclosure.

FIG. 4 is a block diagram of an example of a device 4000 in accordance with embodiments of this disclosure. The device 4000 may include, but is not limited to, a processor 4100, a memory/storage 4200, a communication interface 4300, applications 4400, and a radio frequency device 4500. The device 4000 may include or implement, for example, the user capable device 1600, the mapping capable device 1700, and the monitoring stations 1400. In an implementation, the memory/storage 4200 may store the RF signatures, device capabilities, and the like. The applications 4400 can include, for example, the RF signature client, store application, map application, and the like. The applicable or appropriate methods or techniques described herein may be stored in the memory/storage 4200 and executed by the processor 4100 in cooperation with the memory/storage 4200, the communications interface 4300, the applications 4400, and the radio frequency device 4500 as appropriate. The device 4000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 5:
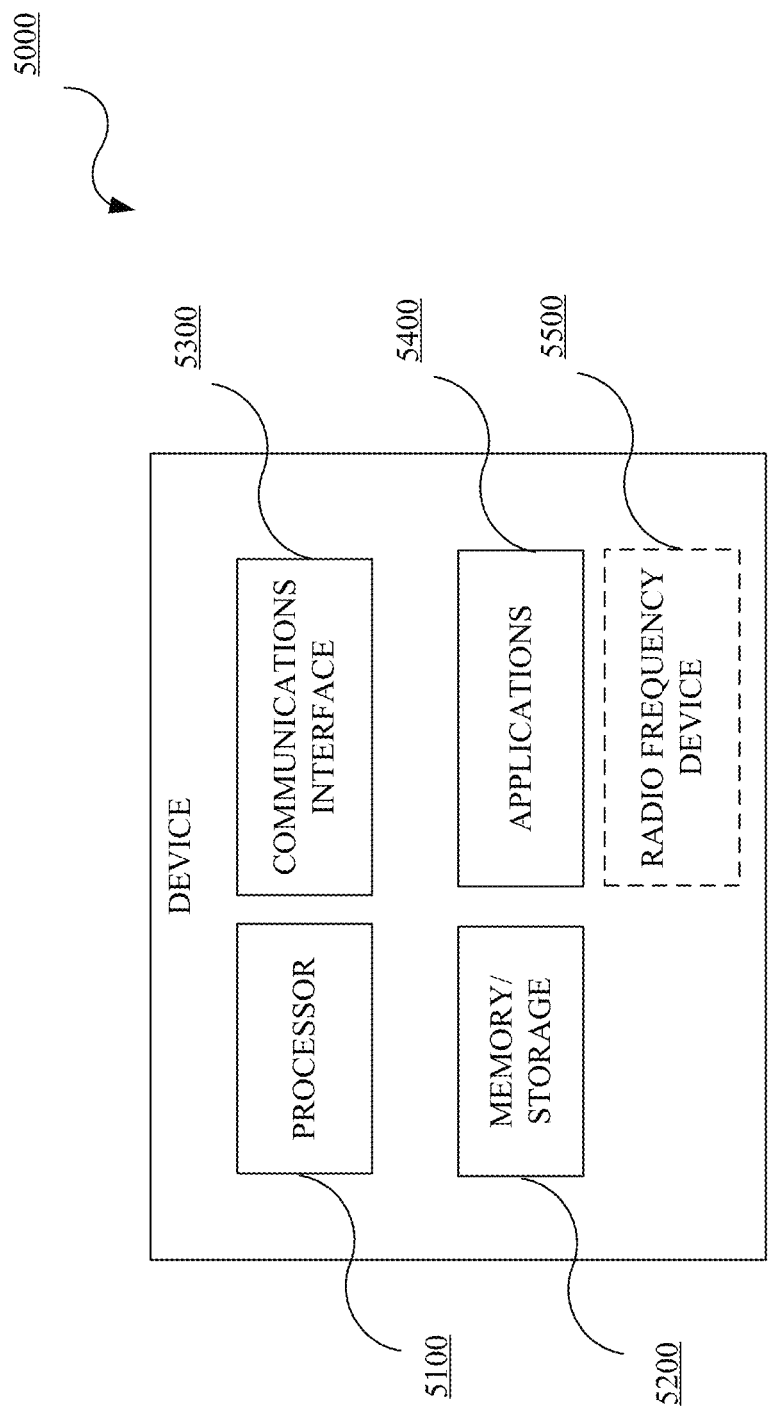
FIG. 5 is a block diagram of an example of a device in accordance with embodiments of this disclosure.

FIG. 5 is a block diagram of an example of a device 5000 in accordance with embodiments of this disclosure. The device 5000 may include, but is not limited to, a processor 5100, a memory/storage 5200, a communication interface 5300, and applications 5400. In an implementation, the device 5000 may include a radio frequency device 5500. The device 5000 may include or implement, for example, the monitoring stations 1400. In an implementation, the memory/storage 5200 may store the techniques or methods described herein and executed by the processor 5100 in cooperation with the memory/storage 5200, the communications interface 5300, the applications 5400, and the radio frequency device 5500 (when applicable) as appropriate. The device 5000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 6:
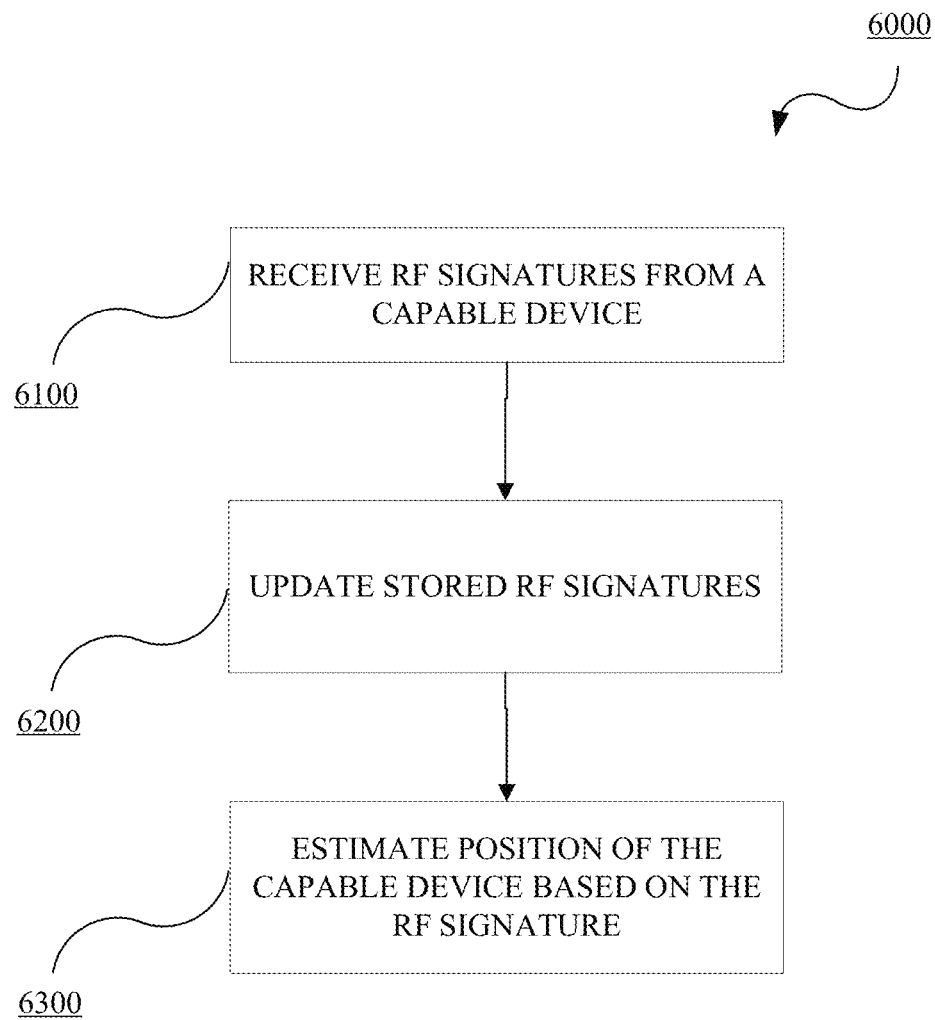
FIG. 6 is a flowchart of an example method for position estimation in accordance with embodiments of this disclosure.

FIG. 6 is a flowchart of an example method 6000 position estimation in accordance with embodiments of this disclosure. The method 6000 includes: receiving 6100 a RF signature from a user capable device; updating 6200 stored RF signatures; and estimating 6300 a position of the user capable device based on the received RF signature. For example, the technique 6000 may be implemented, as applicable and appropriate, by the RF signature or fingerprint location estimation system 1300, the monitoring stations 1400, the location estimation server 1500, the user capable device 1600, and the mapping capable device 1700, as applicable and appropriate.

The method 6000 includes receiving 6100 a RF signature from a user capable device. An environment can be wirelessly connected or networked using, for example, a small cell network, to be a connected environment. A volume representing the connected environment can be subdivided. The subdivisions can be of different sizes and shapes. A connected environment becomes a trained connected environment by determining, during a training phase, a RF signature for each division and an interference degree for each subdivision which has an active radio element as described herein. The RF signatures and interference degree are stored in a server or computing platform. Monitoring stations can scan the trained connected environment for RF measurements and send to the server, which can update the RF signatures as described herein. A person, user, or consumer (a user) with a user capable device present in the trained connected environment can have their position estimated by the server. The user capable device includes a RF signature client or application which is in communication with the server. The user capable device obtains RF measurements and signal quality and calculates a RF signature. The user capable device will send or report the RF measurements and signal quality, the calculated RF signature, and user capable device characteristics to the server.

The method 6000 includes updating 6200 stored RF signatures. The server can use information from the user capable device and/or monitoring stations to update stored RF signatures as appropriate. In some implementations, updates can happen if there is a variance in the RF signatures greater than a defined threshold. In some implementations, updates can happen if there is a variance in the RF signatures greater than a defined threshold and the variance happens over a defined period of time.

The method 6000 includes estimating 6300 a position of the user capable device based on the received RF signature. The server will perform a normalization of the RF signature. The RF signature is adjusted for the user capable device specific loses or gains as reported in the user capable device characteristics. The adjusted RF signature is compared against the stored list of such RF signatures to identify the location or subdivision in which the user capable device is in. This is sent to the RF signature client, which in turn can use it to determine directions or present a location of the user in the environment.

Figure 7:
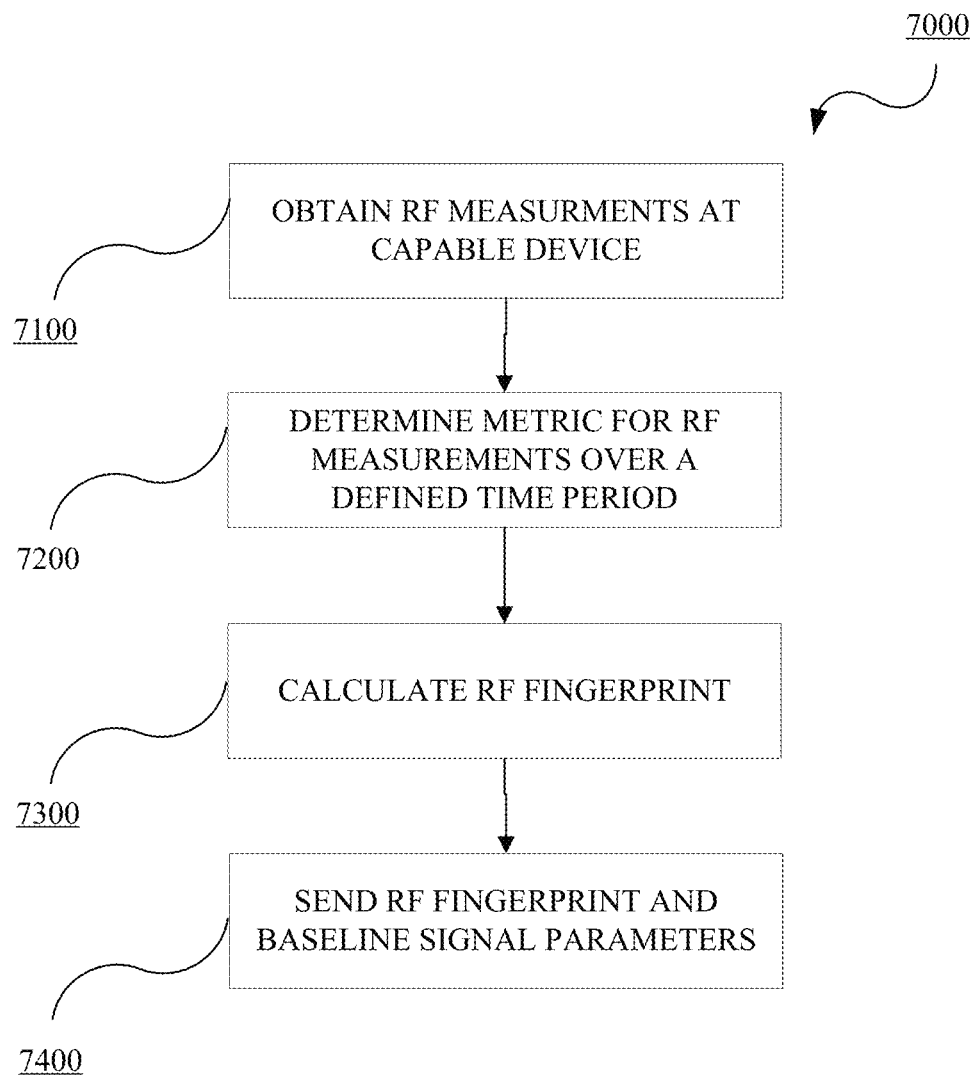
FIG. 7 is a flowchart of an example method for position estimation in accordance with embodiments of this disclosure.

FIG. 7 is a flowchart of an example method 7000 for position estimation in accordance with embodiments of this disclosure. The method 7000 includes: obtaining 7100 RF measurements at a capable device; determining 7200 a metric based on the RF measurements which are taken over a defined period of time; determining 7300 a RF signature from one or more determined RF measurements; and sending 7400 RF signature and capable device baseline signal parameters. For example, the technique 7000 may be implemented, as applicable and appropriate, by the RF signature or fingerprint location estimation system 1300, the monitoring stations 1400, the location estimation server 1500, the user capable device 1600, and the mapping capable device 1700, as applicable and appropriate.

The method 7000 includes obtaining 7100 RF measurements at a capable device. A capable device is present in a trained connected environment as described herein. The capable device makes RF measurements proximate to the location of the capable device. The RF measurements can include, but is not limited to, received signal strength indicator (RSSI), reference signal received power (RSRP), reference signal received quality (RSRQ), or combinations thereof.

The method 7000 includes determining 7200 a metric based on the RF measurements which are taken over a defined period of time. Multiple RF measurements are taken over a period of time to mitigate against bad readings. A metric such as an average, a weighted average, and/or other statistic can be used on the collected RF measurements. For example, weights can be decided in the training period or based on characteristics of the radiating entity in question.

The method 7000 includes determining 7300 a RF signature from one or more determined RF measurements. A RF signature is determined from the determined RF measurements by the RF client loaded on the capable device. In some implementations, a constant number can be added to bias the RF signatures to control the values to match various radio scenarios and/or use the bias to stabilize the values in case of a radio environment that is more dynamic than historical radio environments.

The method 7000 includes sending 7400 RF signature and capable device baseline signal parameters. The calculated RF signature, RF measurements, and capable device baseline signal parameters are transmitted to a location estimation server for estimating a location as described herein.

Figure 8:
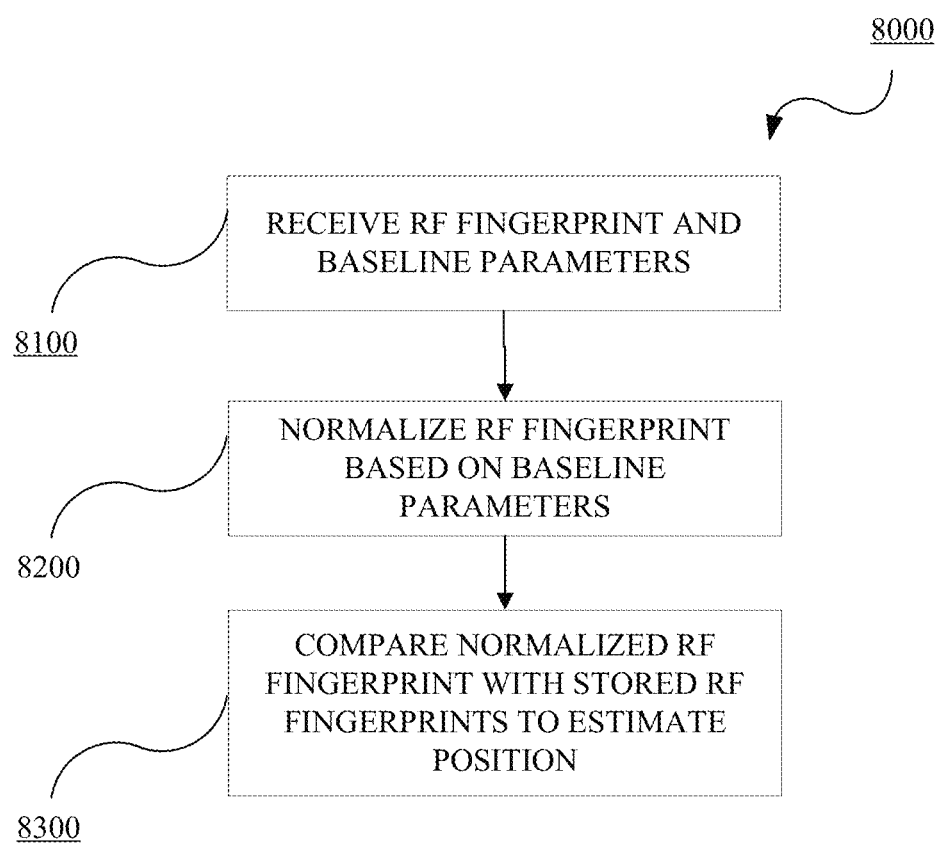
FIG. 8 is a flowchart of an example method for position estimation in accordance with embodiments of this disclosure.

FIG. 8 is a flowchart of an example method 8000 for position estimation in accordance with embodiments of this disclosure. The method 8000 includes: receiving 8100 RF signature and capable device baseline signal parameters; normalizing 8200 the RF signature using the capable device baseline signal parameters; and comparing 8300 the normalized RF signature with stored RF signatures to estimate location. For example, the technique 8000 may be implemented, as applicable and appropriate, by the RF signature or fingerprint location estimation system 1300, the monitoring stations 1400, the location estimation server 1500, the user capable device 1600, and the mapping capable device 1700, as applicable and appropriate.

The method 8000 includes receiving 8100 RF signature and capable device baseline signal parameters. A location estimation server receives a RF signature, RF measurements, and capable device baseline signal parameters from a RF client loaded on a capable device. The RF measurements are with respect to what subdivision the capable object is within with respect to a trained connected environment as described herein.

The method 8000 includes normalizing 8200 the RF signature using the capable device baseline signal parameters. Each capable device has different baseline characteristics with respect to gain, power, and other features which affect RF measurements and RF signature. In addition, the RF signatures stored at the server are with respect to a calibrated device and/or monitoring stations. The server normalizes the RF measurements based on the capable device baseline signal parameters and calibration parameters. The RF signature is then adjusted based on the normalized RF measurements. This establishes a level base for comparisons.

The method 8000 includes comparing 8300 the normalized RF signature with stored RF signatures to estimate location. Location estimation is performed by comparing the normalized RF signature against stored RD signatures. For example, a stored RF signature is selected which is closest to the normalized RF signature.

Figure 9:
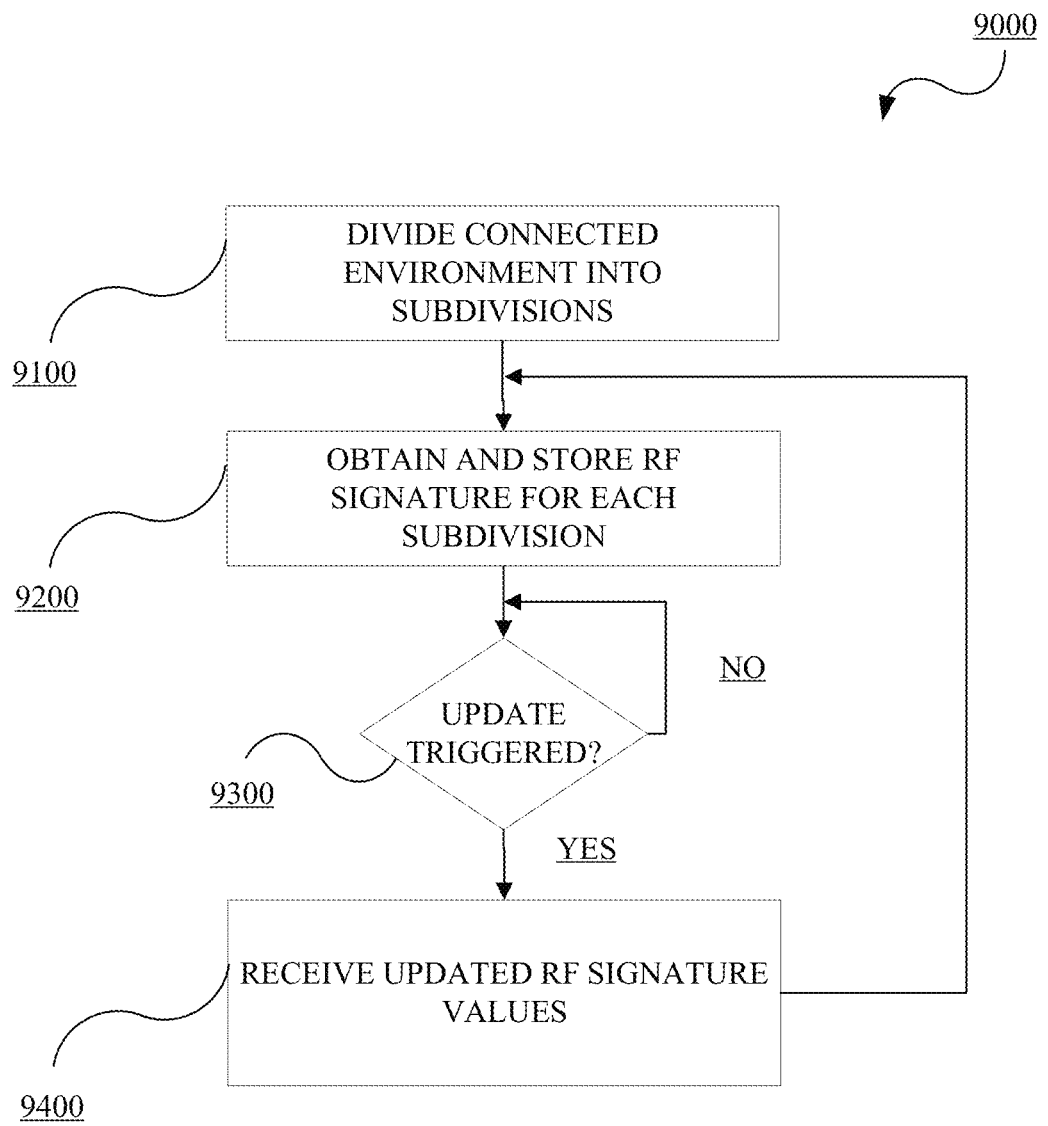
FIG. 9 is a flowchart of an example method for position signature mapping in accordance with embodiments of this disclosure.

FIG. 9 is a flowchart of an example method 9000 for position signature mapping in accordance with embodiments of this disclosure. For example, portions of the method 9000 happen at least during a training phase. The method 9000 includes: dividing 9100 a connected environment into subdivisions; obtaining and storing 9200 RF signatures for each subdivision; determining 9300 whether update is needed; and receiving 9400 updated RF signatures when update is triggered. For example, the technique 9000 may be implemented, as applicable and appropriate, by the RF signature or fingerprint location estimation system 1300, the monitoring stations 1400, the location estimation server 1500, the user capable device 1600, and the mapping capable device 1700, as applicable and appropriate.

The method 9000 includes dividing 9100 a connected environment into subdivisions. An environment is connected as described herein. The connected environment is subdivided for purposes of location estimation. The subdivisions can be of different sizes and shapes. The resolution is variable within the connected environment. During a training phase, the subdivisions can be a first size and shape to get initial RF signatures. Each of the first or initial subdivisions can be further divided during the training phase based on parameters including, but not limited to, computational resources and meeting a defined resolution.

The method 9000 includes obtaining and storing 9200 RF signatures for each subdivision. A calibrated capable device or training capable device can be used to obtain RF signatures for each subdivision. These are reported to the server. Calibration provides a means for normalization of RF signatures received from user capable devices.

The method 9000 includes determining 9300 whether an update is needed and receiving 9400 updated RF signatures when update is triggered. Determining RF signatures for a subdivision is a recursive and repetitive process due to different loading conditions present in the connected environment. For example, loading conditions can change due to the presence of active radio elements in one or more of the subdivisions. Different loading conditions for the active radio elements are cycled though. For example, different power levels for the active radio elements in the one or more of the subdivisions can be set to determine RF interference levels as between different subdivisions. This can be used to determine an interference degree for each of the active radio elements. The interference degree is stored at the server. In another example, multiple capable devices can be operated in the connected environment to present different loading conditions. An update can be triggered when the RF signature varies a defined threshold from a stored RF signature. This can continue for a defined duration of the training process or when RF signatures have reached a steady state. For example, the stored RF signatures have not changed after cycling through various loading conditions in the connected environment.

Figure 10:
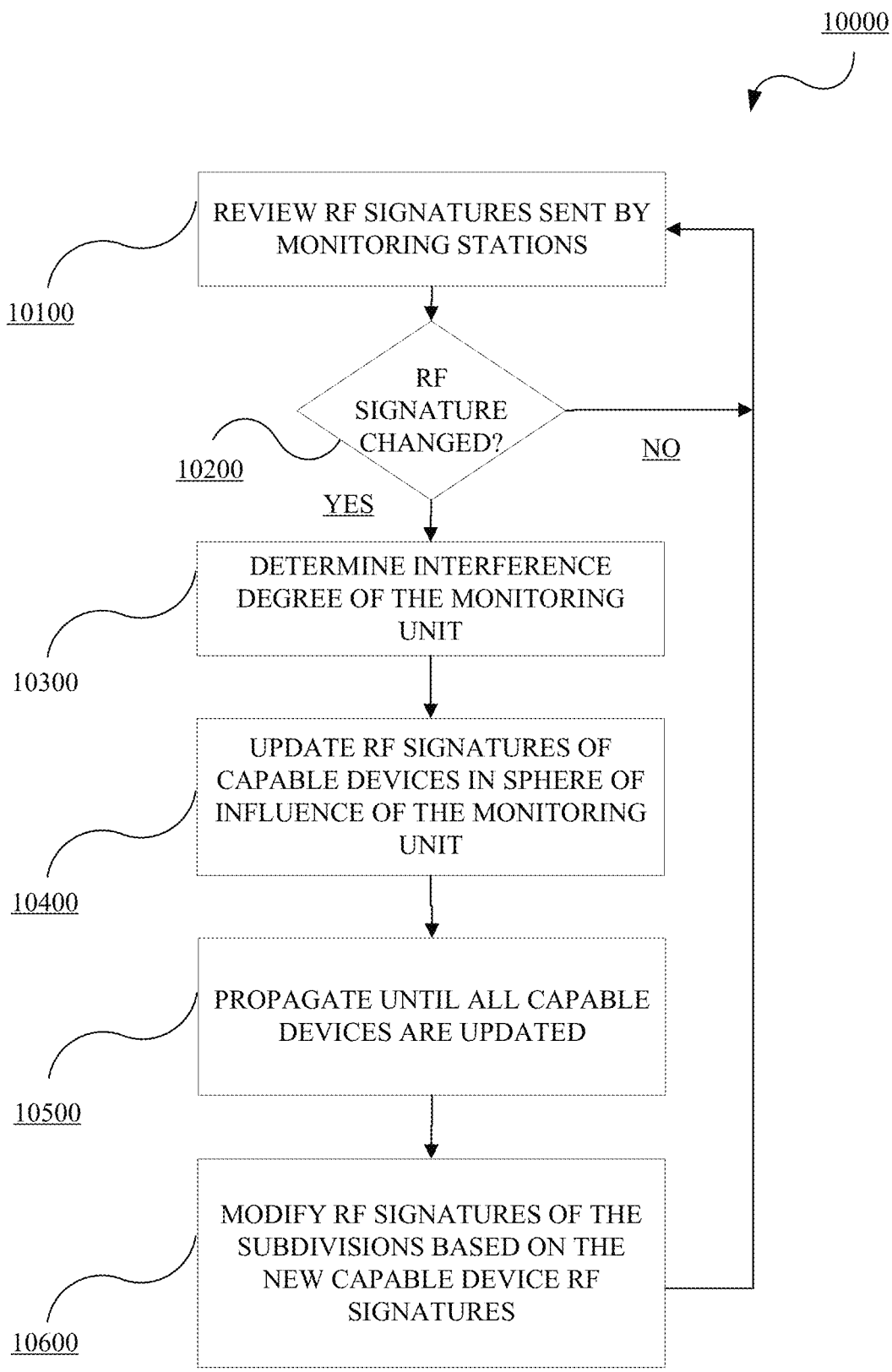
FIG. 10 is a flowchart of an example method for localized update in accordance with embodiments of this disclosure.

FIG. 10 is a flowchart of an example method 10000 for localized updates in accordance with embodiments of this disclosure. The localized update can be used for training and operational phases of RF signature based location estimation. The method 10000 includes: reviewing 10100 RF signatures received from monitoring stations; determining 10200 whether a stored RF signature has changed; determining 10300 interference degree of the monitoring unit; updating 10400 RF signatures for capable devices in the trained connected environment; propagating 10500 changes until applicable capable devices in the trained connected environment are updated; and modifying 10600 stored RF signatures of subdivisions based on the updated RF signatures of the capable devices. For example, the technique 10000 may be implemented, as applicable and appropriate, by the RF signature or fingerprint location estimation system 1300, the monitoring stations 1400, the location estimation server 1500, the user capable device 1600, and the mapping capable device 1700, as applicable and appropriate.

The method 10000 includes reviewing 10100 RF signatures received from monitoring stations and determining 10200 whether a stored RF signature has changed. As described herein, monitoring stations can scan a trained connected environment, obtain RF measurements, and determine RF signatures. These RF signatures are compared against the appropriate stored RF signatures. In some implementations, updates are triggered if the compared signatures are different by a defined threshold. In some implementations, updates are triggered if the compared signatures are different by a defined threshold for a defined period of time. This mitigates the chances of updating RF signatures due to RF spikes or short term issues.

The method 10000 includes determining 10300 interference degree of the monitoring unit. The interference degree determines to what extent RF signatures for neighboring subdivisions are updated based on the triggered update as described herein. These are stored in the server for each active radiating element including the monitoring stations. They are determined during training and can be updated as needed.

The method 10000 includes updating 10400 RF signatures for capable devices in the trained connected environment and propagating 10500 changes until applicable capable devices in the trained connected environment are updated. Based on the interference degree, the RF signatures are updated for user capable devices undergoing location estimation by the server.

The method 10000 includes modifying 10600 stored RF signatures of subdivisions based on the updated RF signatures of the capable devices. Based on the interference degree, the stored RF signatures are updated by the server.

Figure 11:
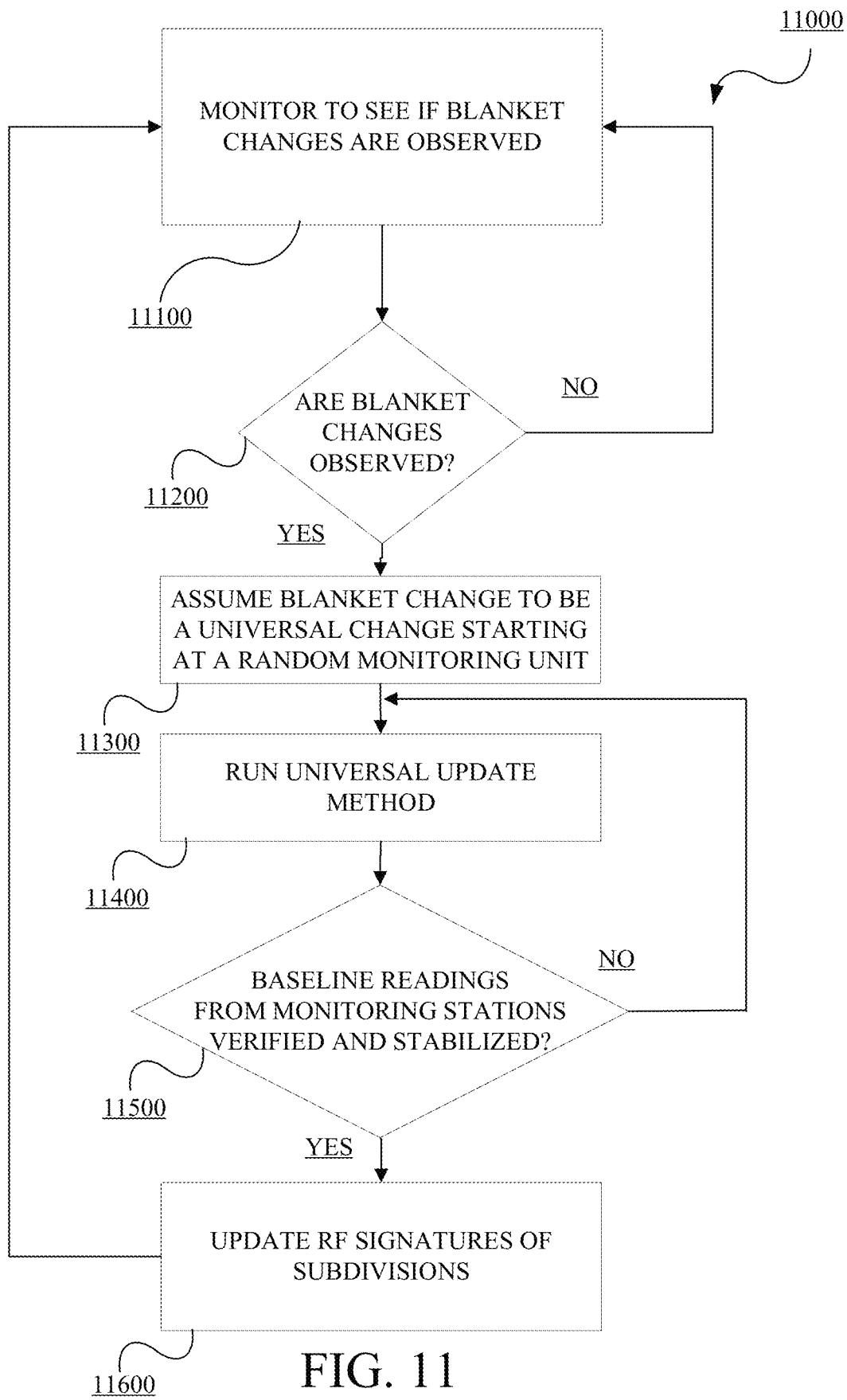
FIG. 11 is a flowchart of an example method for blanket update in accordance with embodiments of this disclosure.

FIG. 11 is a flowchart of an example method 11000 for blanket update in accordance with embodiments of this disclosure. These are factors that affect the entirety of the environment and hence change the RF signatures across all the subdivisions. However, these blanket changes also receive a feedback from the changes occurring in the subdivisions and hence are not a completely isolated factor. That is, a blanket update is a form of universal update with feedback affects. The blanket update can be used for training and operational phases of RF signature based location estimation. The method 11000 includes: monitoring 11100 for blanket changes; determining 11200 whether a blanket change is observed; selecting 11300 a monitoring station to initiate update; executing 11400 universal update; confirming 11500 baseline readings from monitoring stations; and updating 11600 stored RF signatures. For example, the technique 11000 may be implemented, as applicable and appropriate, by the RF signature or fingerprint location estimation system 1300, the monitoring stations 1400, the location estimation server 1500, the user capable device 1600, and the mapping capable device 1700, as applicable and appropriate.

The method 11000 includes monitoring 11100 for blanket changes and determining 11200 whether a blanket change is observed. The system continuously monitors the connected environment monitor for blanket changes in the RF measurements and RF signatures. For example, a configurable number of monitoring stations can report RF measurements and RF signatures. Changes are compared against stored RF signatures, for example. In some implementations, variations are noted if changes are greater than a defined threshold. In some implementations, variations are noted if changes are greater than a defined threshold and for a defined period of time. That is, the system waits to stabilize to a final value if changes are noted in interference levels and/or RF signatures and whether these changes remain fluctuating (meaning there is a feedback from the system back to the source of the RF change).

The method 11000 includes selecting 11300 a monitoring station to initiate update and executing 11400 universal update. If changes are observed, then blanket updates are initiated. The blanket change is assumed to be a universal update as described in FIG. 12 and initiated from a randomly selected monitoring station.

The method 11000 includes confirming 11500 baseline readings from monitoring stations. RF measurements and RF signature are received from the monitoring stations until steady state RF signatures are obtained. The update process is iterative and continues until variances between each of the reported RF signatures for each of the subdivisions fall within a defined threshold. That is, each subdivision has reported RF signatures which remain within the defined threshold of each other.

The method 11000 includes updating 11600 stored RF signatures. Once stability has been reached for the connected environment, the stored RF signatures are replaced with the updated RF signatures.

Figure 12:
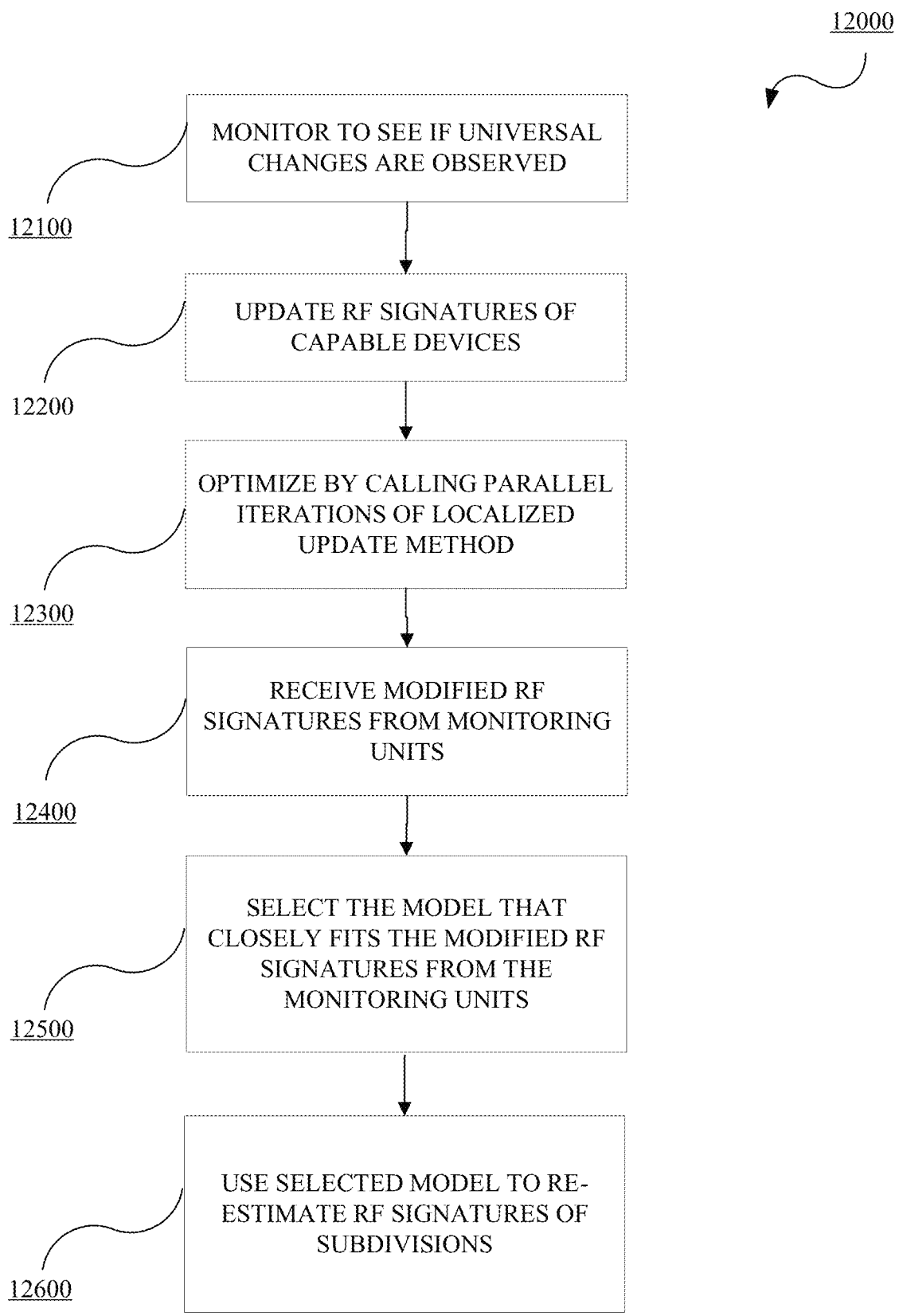
FIG. 12 is a flowchart of an example method for universal update in accordance with embodiments of this disclosure.

FIG. 12 is a flowchart of an example method 12000 for universal update in accordance with embodiments of this disclosure. These are factors that affect the entirety of the environment and hence change the RF signatures for all the subdivisions. However, these are completely isolated from the changes occurring in the subdivisions and hence they are not receiving any feedback from the state of RF in the subdivisions. The universal update can be used for training and operational phases of RF signature based location estimation. The method includes: monitoring 12100 for universal changes; updating 12200 RF signatures for capable devices for which location estimation is being performed; optimizing 12300 updates by executing parallel localized updates; receiving 12400 updated RF signatures from monitoring stations; selecting 12500 update model which best fits the update RF signatures; and re-determining 12600 stored RF signatures using RF signatures based on selected model. For example, the technique 12000 may be implemented, as applicable and appropriate, by the RF signature or fingerprint location estimation system 1300, the monitoring stations 1400, the location estimation server 1500, the user capable device 1600, and the mapping capable device 1700, as applicable and appropriate.

The method 12000 includes monitoring 12100 for universal changes. The system continuously monitors the connected environment monitor for universal changes in the RF measurements and RF signatures. For example, the monitoring stations can report RF measurements and RF signatures. Changes are compared against stored RF signatures, for example. In some implementations, variations are noted if changes are greater than a defined threshold. In some implementations, variations are noted if changes are greater than a defined threshold and for a defined period of time. In this instance, monitoring units observe changes and attain steady state immediately. This is possible since the monitoring devices are outside of each other's sphere of influence. For universal changes, there is no feedback from the modification of RF signatures on the monitoring units back to the external source. Thus, steady state is attained nearly instantaneously.

The method 12000 includes updating 12200 RF signatures for capable devices for which location estimation is being performed. The observed RF signatures are used to update the RF signatures for capable devices for which location estimation is being performed and for monitoring stations. For example, the observed changes can be due to the number of capable devices in the environment (e.g., changing the load in the environment).

The method 12000 includes optimizing 12300 updates by executing parallel localized updates. The updating process for the stored RF signatures are done by executing multiple parallel localized updates as described in FIG. 10.

The method 12000 includes receiving 12400 updated RF signatures from monitoring stations and selecting 12500 update model which best fits the update RF signatures. The monitoring unit RF signatures can be calculated at the initial installation of the grid. These RF signatures can change over time as new radiating and active radio units come into the vicinity of the monitoring station. Consequently, the RF signatures are updated over time. The RF signatures from the localized updates are used to determine which type of update, local, blanket, or universal, to execute to update the stored RF signatures.

The method 12000 includes re-determining 12600 stored RF signatures using RF signatures based on selected model. The output of the selected update method is used to update the stored RF signatures. That is, when the RF signatures are updated, the stored values are also updated. In the event of a new and/or previously unseen network event, loading condition, and/or traffic pattern that resulted in the RF signature change, the updated values may be stored with a corresponding RF characteristic file for future reference. This enables the system to react to this event, loading condition, and/or traffic pattern if observed at a later time. For example, the system can load the stored RF signatures as a starting point for optimizing the new RF signatures instead of relearning. This speeds up the overall process. For example, the conditions can include, for example, time, date, weather, sales events, and the like. A key or index can be used to reload the stored RF signatures upon re-occurrence of the conditions.

In general and in some implementations, a method for location estimation includes receiving, by a location estimation server, a radio frequency (RF) signature associated with a user device present in a connected environment, updating, by the location estimation server, stored RF signatures based on RF signatures received from the user device, monitoring stations, and active radio emitting devices in the connected environment when a defined threshold for one or more stored RF signatures is exceeded, wherein each stored RF signature corresponds to a subdivision in the connected environment and estimating, by the location estimation server, a location of the user device in the connected environment by comparing the RF signature of the user device with the stored RF signatures or updated stored RF signatures. In some implementations, the method includes receiving, by the location estimation server, RF measurements and user device characteristics associated with the user device and normalizing, by the location estimation server, the RF signature of the user device by using the RF measurements and user device characteristics. In some implementations, the updating occurs when the defined threshold is exceeded over a defined period of time. In some implementations, the updating further includes obtaining, by the location estimation server, an interference degree for a monitoring station triggering an update, updating RF signatures for user devices in subdivisions as per the interference degree, and updating the stored RF signatures based on the updated RF signatures for the user devices. In some implementations, the updating further includes monitoring, by the location estimation server, for RF measurement and RF signature changes that have feedback as between different monitoring stations and active radio emitting devices, selecting, by the location estimation server, a monitoring station from which to start an update, updating, by the location estimation server, RF signatures for user devices in subdivisions, executing in parallel for each subdivision: obtaining, by the location estimation server, an interference degree as appropriate for a subdivision, updating, by the location estimation server, RF signatures for user devices in subdivisions as per the interference degree and the monitoring stations, and updating, by the location estimation server, the stored RF signatures based on the updated RF signatures for the user devices, receiving, by the location estimation server, updated RF signatures from the monitoring stations, re-determining, by the location estimation server, the stored RF signatures for each subdivision using an update model representative of the updated RF signatures from the monitoring stations, confirming, by the location estimation server, stability of the re-determined stored RF signatures, and updating, by the location estimation server, the stored RF signatures upon reaching a steady state. In some implementations, the updating further includes monitoring, by the location estimation server, for RF measurement and RF signature changes that affect each subdivision, updating, by the location estimation server, RF signatures for user devices in subdivisions, executing in parallel for subdivision: obtaining, by the location estimation server, an interference degree as appropriate for a subdivision, updating, by the location estimation server, RF signatures for user devices in subdivisions as per the interference degree and the monitoring stations, and updating, by the location estimation server, the stored RF signatures based on the updated RF signatures for the user devices, receiving, by the location estimation server, updated RF signatures from the monitoring stations, and re-determining, by the location estimation server, the stored RF signatures for each subdivision using an update model representative of the updated RF signatures from the monitoring stations. In some implementations, sizes or shapes of subdivisions in the connected environment are different. In some implementations, conditions associated with certain updated RF signatures are stored as a key to re-use the certain updated RF signatures as initial RF signatures upon re-occurrence of the conditions.

In general, and in some implementations, a system for position estimation includes monitoring stations and a server in communication with the monitoring stations. The server configured to receive a radio frequency (RF) fingerprint associated with a device present in a monitored environment, update stored RF fingerprints based on RF fingerprints received from at least one of the device, the monitoring stations, and active radio emitting devices in the monitored environment when a threshold for one or more stored RF fingerprints is exceeded, wherein each stored RF fingerprint corresponds to a portion of the monitored environment, and determine a position of the device in the monitored environment by comparing the RF fingerprint of the device with the stored RF fingerprints or updated stored RF fingerprints. In some implementations, the server further configured to receive RF measurements and device characteristics associated with the device and normalize the RF fingerprint of the device by using the RF measurements and device characteristics. In some implementations, updating occurs when the threshold is exceeded over a defined period of time. In some implementations, the server further configured to determine an interference degree for a monitoring station triggering an update, update RF fingerprints for devices in portions per the interference degree, and update the stored RF fingerprints based on the updated RF fingerprints for the devices. In some implementations, the server further configured to monitor for RF measurement and RF fingerprint changes that have feedback as between different monitoring stations and active radio emitting devices, determine a monitoring station from which to start an update, update RF fingerprints for devices in portions, execute in parallel for each portion: determine an interference degree as appropriate for a portion, update RF fingerprints for devices in portions as per the interference degree and the monitoring stations, and update the stored RF signatures based on the updated RF fingerprints for the devices, receive updated RF fingerprints from the monitoring stations, re-determine the stored RF fingerprints for each portion using an update model representative of the updated RF fingerprints from the monitoring stations, confirm readiness of the re-determined stored RF fingerprints, and update the stored RF fingerprints upon reaching a steady state. In some implementations, the server further configured to monitor for RF measurement and RF fingerprint changes that affect each portion, update RF fingerprints for devices in portions, execute in parallel for each portion: determine an interference degree as appropriate for a portion, update RF fingerprints for devices in portions as per the interference degree and the monitoring stations, and update the stored RF fingerprints based on the updated RF fingerprints for the devices, receive updated RF fingerprints from the monitoring stations, and re-determine the stored RF signatures for each portion using an update model representative of the updated RF fingerprints from the monitoring stations. In some implementations, sizes or shapes of portions in the monitored environment are different. In some implementations, conditions associated with certain updated RF fingerprints are stored as a key, the server further configured to: load, using the key, the certain updated RF fingerprints upon re-occurrence of the conditions.

In general, and in some implementations, a method for location estimation includes receiving, by a server, a radio frequency (RF) signature, RF measurements, and device characteristics associated with a user device present in a connected environment, normalizing, by the server, the RF signature of the user device by using the RF measurements and the device characteristics, updating, by the server, stored RF signatures based on at least the RF signatures received from the user device, monitoring stations, and RF emitting devices in the connected environment when a defined threshold for one or more stored RF signatures is at least met, wherein each stored RF signature corresponds to a subdivision in the connected environment, and estimating, by the server, a position of the user device in the connected environment by comparing the RF signature of the user device with the stored RF signatures or updated stored RF signatures. In some implementations, the updating occurs when the defined threshold is exceeded over a defined period of time. In some implementations, the updating further includes obtaining, by the server, an interference degree for a monitoring station triggering an update, updating RF signatures for user devices in subdivisions as per the interference degree, and updating the stored RF signatures based on the updated RF signatures for the user devices. In some implementations, sizes or shapes of subdivisions in the connected environment vary.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for location estimation, the method comprising:
   receiving, by a location estimation server, a radio frequency (RF) signature associated with a user device present in a connected environment;
   receiving, by the location estimation server, RF measurements and user device characteristics associated with the user device;
   normalizing, by the location estimation server, a value of the RF signature of the user device by using the RF measurements and user device characteristics;
   updating, by the location estimation server, stored RF signatures based on at least one of RF signatures received from the user device, monitoring stations, and active radio emitting devices in the connected environment when a variance in one or more of the stored RF signatures exceeds a defined threshold based on the at least one of RF signatures,
   wherein each stored RF signature corresponds to a subdivision in the connected environment; and
   estimating, by the location estimation server, a location of the user device in the connected environment by comparing the RF signature of the user device with the stored RF signatures or updated stored RF signatures.

2. The method of claim 1, wherein the updating occurs when the defined threshold is exceeded over a defined period of time.

3. The method of claim 1, wherein the updating further comprises:
obtaining, by the location estimation server, an interference degree for a monitoring station triggering an update;
updating RF signatures for user devices in subdivisions as per the interference degree; and
updating the stored RF signatures based on the updated RF signatures for the user devices.

4. The method of claim 1, wherein the updating further comprises:
monitoring, by the location estimation server, for RF measurement and RF signature changes that have feedback as between different monitoring stations and active radio emitting devices;
selecting, by the location estimation server, a monitoring station from which to start an update;
updating, by the location estimation server, RF signatures for user devices in subdivisions;
executing in parallel for each subdivision:
obtaining, by the location estimation server, an interference degree as appropriate for a subdivision;
updating, by the location estimation server, RF signatures for user devices in subdivisions as per the interference degree and the monitoring stations; and
updating, by the location estimation server, the stored RF signatures based on the updated RF signatures for the user devices;
receiving, by the location estimation server, updated RF signatures from the monitoring stations;
re-determining, by the location estimation server, the stored RF signatures for each subdivision using an update model representative of the updated RF signatures from the monitoring stations;
confirming, by the location estimation server, stability of the re-determined stored RF signatures; and
updating, by the location estimation server, the stored RF signatures upon reaching a steady state.

5. The method of claim 1, wherein the updating further comprises:
monitoring, by the location estimation server, for RF measurement and RF signature changes that affect each subdivision;
updating, by the location estimation server, RF signatures for user devices in subdivisions;
executing in parallel for subdivision:
obtaining, by the location estimation server, an interference degree as appropriate for a subdivision;
updating, by the location estimation server, RF signatures for user devices in subdivisions as per the interference degree and the monitoring stations; and
updating, by the location estimation server, the stored RF signatures based on the updated RF signatures for the user devices;
receiving, by the location estimation server, updated RF signatures from the monitoring stations; and
re-determining, by the location estimation server, the stored RF signatures for each subdivision using an update model representative of the updated RF signatures from the monitoring stations.

6. The method of claim 1, wherein sizes or shapes of subdivisions in the connected environment are different.

7. The method of claim 1, wherein conditions associated with certain updated RF signatures are stored as a key to re-use the certain updated RF signatures as initial RF signatures upon re-occurrence of the conditions.

8. A system for position estimation, comprising:
monitoring stations; and
a server in communication with the monitoring stations, the server configured to:
receive a radio frequency (RF) fingerprint associated with a device present in a monitored environment;
receive RF measurements and device characteristics associated with the device;
normalize a value of the RF fingerprint of the device by using the RF measurements and device characteristics;
update stored RF fingerprints based on RF fingerprints received from at least one of the device, the monitoring stations, and
active radio emitting devices in the monitored environment when a variance in one or more of the stored RF fingerprints exceeds a threshold based on the at least one of RF fingerprints,
wherein each stored RF fingerprint corresponds to a portion of the monitored environment; and
determine a position of the device in the monitored environment by comparing the RF fingerprint of the device with the stored RF fingerprints or updated stored RF fingerprints.

9. The system of claim 8, wherein an update occurs when the threshold is exceeded over a defined period of time.

10. The system of claim 8, the server further configured to:
determine an interference degree for a monitoring station triggering an update;
update RF fingerprints for devices in portions per the interference degree; and
update the stored RF fingerprints based on the updated RF fingerprints for the devices.

11. The system of claim 8, the server further configured to:
monitor for RF measurement and RF fingerprint changes that have feedback as between different monitoring stations and active radio emitting devices;
determine a monitoring station from which to start an update;
update RF fingerprints for devices in portions;
execute in parallel for each portion:
determine an interference degree as appropriate for a portion;
update RF fingerprints for devices in portions as per the interference degree and the monitoring stations; and
update the stored RF signatures based on the updated RF fingerprints for the devices;
receive updated RF fingerprints from the monitoring stations;
re-determine the stored RF fingerprints for each portion using an update model representative of the updated RF fingerprints from the monitoring stations;
confirm readiness of the re-determined stored RF fingerprints; and
update the stored RF fingerprints upon reaching a steady state.

12. The system of claim 8, the server further configured to:
monitor for RF measurement and RF fingerprint changes that affect each portion;
update RF fingerprints for devices in portions;

execute in parallel for each portion:
  determine an interference degree as appropriate for a portion;
  update RF fingerprints for devices in portions as per the interference degree and the monitoring stations; and
  update the stored RF fingerprints based on the updated RF fingerprints for the devices;
receive updated RF fingerprints from the monitoring stations; and
re-determine the stored RF signatures for each portion using an update model representative of the updated RF fingerprints from the monitoring stations.

13. The system of claim 8, wherein sizes or shapes of portions in the monitored environment are different.

14. The system of claim 8, wherein conditions associated with certain updated RF fingerprints are stored as a key, the server further configured to:
  load, using the key, the certain updated RF fingerprints upon re-occurrence of the conditions.

15. A method for location estimation, the method comprising:
  receiving, by a server, a radio frequency (RF) signature, RF measurements, and device characteristics associated with a user device present in a connected environment;
  normalizing, by the server, a value of the RF signature of the user device by using the RF measurements and the device characteristics;
  updating, by the server, stored RF signatures based on at least the RF signatures received from at least one of the user device, monitoring stations, and RF emitting devices in the connected environment when a variance in one or more of the RF signatures at least meets a defined threshold based on the at least the RF signatures,
  wherein each stored RF signature corresponds to a subdivision in the connected environment; and
  estimating, by the server, a position of the user device in the connected environment by comparing the RF signature of the user device with the stored RF signatures or updated stored RF signatures.

16. The method of claim 15, wherein the updating occurs when the defined threshold is exceeded over a defined period of time.

17. The method of claim 15, wherein the updating further comprises:
  obtaining, by the server, an interference degree for a monitoring station triggering an update;
  updating RF signatures for user devices in subdivisions as per the interference degree; and
  updating the stored RF signatures based on the updated RF signatures for the user devices.

18. The method of claim 15, wherein sizes or shapes of subdivisions in the connected environment vary.

* * * * *

UNITED STATES PATENT AND TRADEMARK OFFICE
CERTIFICATE OF CORRECTION

PATENT NO. : 12,108,361 B2
APPLICATION NO. : 17/679466
DATED : October 1, 2024
INVENTOR(S) : Vinayak Kumar Thotton Veettil Page 1 of 1

It is certified that error appears in the above-identified patent and that said Letters Patent is hereby corrected as shown below:

In the Claims

Column 18, Claim 1, Lines 58 is spaced as a new paragraph when it should be a continuation of the paragraph that began at Line 55.

Signed and Sealed this
Seventh Day of January, 2025

Derrick Brent
*Acting Director of the United States Patent and Trademark Office*